(12) United States Patent
Yang et al.

(10) Patent No.: US 10,887,763 B2
(45) Date of Patent: Jan. 5, 2021

(54) ELECTRONIC DEVICE AND PRIVACY PROTECTION MODULE THEREOF

(71) Applicant: CHICONY ELECTRONICS CO., LTD., New Taipei (TW)

(72) Inventors: San-Pen Yang, New Taipei (TW); Cheng-Hun Yang, New Taipei (TW)

(73) Assignee: CHICONY ELECTRONICS CO., LTD., New Taipei (TW)

( * ) Notice: Subject to any disclaimer, the term of this patent is extended or adjusted under 35 U.S.C. 154(b) by 0 days.

(21) Appl. No.: 16/523,251

(22) Filed: Jul. 26, 2019

(65) Prior Publication Data
US 2020/0196142 A1 Jun. 18, 2020

(30) Foreign Application Priority Data
Dec. 12, 2018 (TW) .............................. 107144831 A (51) Int. Cl.
H04W 12/02 (2009.01)
G06F 1/16 (2006.01)
H04N 5/235 (2006.01)
G03B 11/04 (2006.01)
H04M 1/02 (2006.01)

(52) U.S. Cl.
CPC ........... *H04W 12/02* (2013.01); *G03B 11/043* (2013.01); *G06F 1/1686* (2013.01); *H04M 1/0264* (2013.01); *H04N 5/2353* (2013.01)

(58) Field of Classification Search
CPC ... G03B 11/043; G06F 1/1686; H04M 1/0264
USPC ......................................................... 455/411
See application file for complete search history.

(56) References Cited

U.S. PATENT DOCUMENTS

| | | | | |
|---|---|---|---|---|
| 6,211,457 B1 * | 4/2001 | Cama | .................. | H05K 9/0018 174/380 |
| 7,061,536 B2 * | 6/2006 | Cha | ........................ | G06F 1/1616 348/376 |
| 7,435,018 B2 * | 10/2008 | Huang | ................... | G03B 17/04 348/373 |
| 7,677,815 B2 * | 3/2010 | Lane | ..................... | G06F 1/1686 396/348 |
| 8,242,924 B2 * | 8/2012 | Huang | .................. | G06F 1/1616 340/686.1 |
| 9,197,850 B2 * | 11/2015 | Koberling | .............. | H04N 7/147 |
| 10,070,021 B1 * | 9/2018 | Rolle | ................... | H04N 5/2252 |

(Continued)

FOREIGN PATENT DOCUMENTS

| | | |
|---|---|---|
| CN | 207304708 U | 5/2018 |
| TW | M489304 Y | 11/2014 |
| TW | I639879 B | 11/2018 |

*Primary Examiner* — Congvan Tran
(74) *Attorney, Agent, or Firm* — Muncy, Geissler, Olds & Lowe, P.C.

(57) ABSTRACT

A privacy protection module applied to an electronic device is disclosed. The electronic device includes a camera module which has a circuit board and a lens. The lens is connected to the circuit board. The privacy protection module includes a case, a hole, a shutter and an actuator. The case covers the camera module. The hole is located on the case and aligned with the lens. The actuator is located on the case and electrically connected to the circuit board; the actuator moves along a first direction or a second direction when the actuator is driven by electronic power. The shutter is next to the hole and connected to the actuator.

16 Claims, 7 Drawing Sheets

(56) References Cited

U.S. PATENT DOCUMENTS

2018/0059510 A1\* 3/2018 Gustaveson, II ..... G06F 1/1686
2018/0367720 A1 12/2018 Lu et al.
2019/0179212 A1\* 6/2019 Leimer .................. H04N 5/232

\* cited by examiner

ELECTRONIC DEVICE AND PRIVACY PROTECTION MODULE THEREOF

BACKGROUND OF THE INVENTION

1. Field of the Invention

The present invention relates to a privacy protection module; more particularly, the present invention relates to a privacy protection module which can protect the user's privacy.

2. Description of the Related Art

Currently, most of the smart phones or notebook computers on the market have a camera module which provides a photography function; thus, the user can use the smart phone or the notebook computer to take photographs and videos anytime and anywhere, or to video chat or stream video online with the network function of the smart phone or the notebook computer.

However, a hacker may use an illegal program to invade the smart phone or the notebook computer, to remotely control the camera module of the smart phone or the notebook computer, and to surreptitiously acquire private images of the user, which can cause great damage to the privacy and safety of the user of the smart phone or the notebook computer.

Therefore, there is a need to provide a privacy protection module to protect the user's privacy and to prevent a hacker from surreptitiously obtaining images of the user.

SUMMARY OF THE INVENTION

It is an object of the present invention to provide a privacy protection module which can protect the user's privacy.

To achieve the abovementioned object, a privacy protection module of the present invention is applied to an electronic device. The electronic device includes a camera module. The camera module includes a circuit board and a lens. The lens is connected to the circuit board. The privacy protection module includes a case, a hole, a shutter and an actuator. The case covers the camera module. The hole is located on the case, and the hole is aligned with the lens. The actuator is located in the case and electrically connected to the circuit board. The actuator moves along a first direction or a second direction when the actuator is driven by electricity. The shutter is located next to the hole and linked to the actuator. When the actuator moves along the first direction, the actuator causes the shutter to move to a first position for covering the lens. When the actuator moves along the second direction, the actuator causes the shutter to move to a second position such that the lens is exposed to the outside through the hole.

According to one embodiment of the present invention, the privacy protection module further includes a positioning groove, the positioning groove is located on the case, and a shape of the positioning groove is corresponded to the lens.

According to one embodiment of the present invention, the privacy protection module further includes at least one positioning column, and the positioning column is connected to the case. The circuit board further includes at least one positioning hole. The position of the positioning column is corresponded to the positioning hole.

According to one embodiment of the present invention, the shutter further includes a pivotal connection part, and the pivotal connection part and the case are pivotally connected to each other. The actuator includes a connection part, and the connection part is connected to the shutter. When the actuator is driven by electricity, the actuator causes the shutter to rotate relative to the case between the first position and the second position.

According to one embodiment of the present invention, the privacy protection module further includes a switch, and the switch is electrically connected to the actuator.

According to one embodiment of the present invention, the privacy protection module further includes at least one electrical connection dot, and the electrical connection dot is electrically connected to the circuit board by welding.

Another object of the present invention is to provide an electronic device which can protect the user's privacy.

To achieve the abovementioned object, the electronic device of the present invention includes a camera module and a privacy protection module. The camera module includes a circuit board and a lens. The lens is connected to the circuit board. The privacy protection module includes a case, a hole, a shutter and an actuator. The case covers the camera module. The hole is located on the case, and the hole is aligned with the lens. The actuator is located in the case and electrically connected to the circuit board. The actuator moves along a first direction or a second direction when the actuator is driven by electricity. The shutter is located next to the hole and linked to the actuator. When the actuator moves along the first direction, the actuator causes the shutter to move to a first position for covering the lens. When the actuator moves along the second direction, the actuator causes the shutter to move to a second position such that the lens is exposed to the outside through the hole.

DETAILED DESCRIPTION OF THE PREFERRED EMBODIMENT

Figure 1:
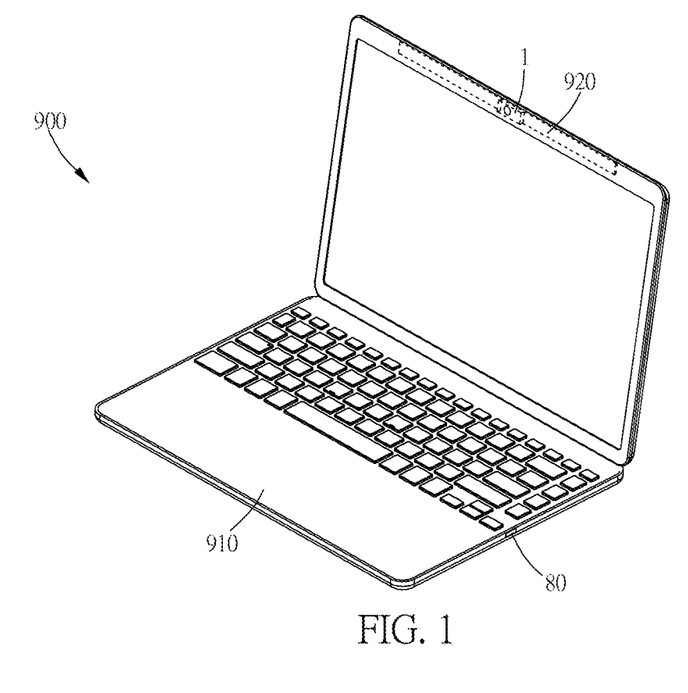
FIG. 1 illustrates a schematic drawing of the electronic device in one embodiment of the present invention.
Figure 2:
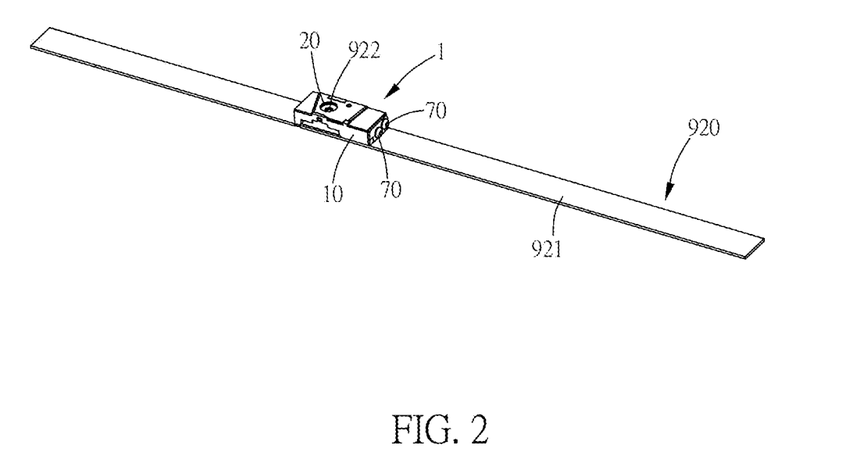
FIG. 2 illustrates a schematic drawing of the privacy protection module and the camera module in one embodiment of the present invention.
Figure 3:
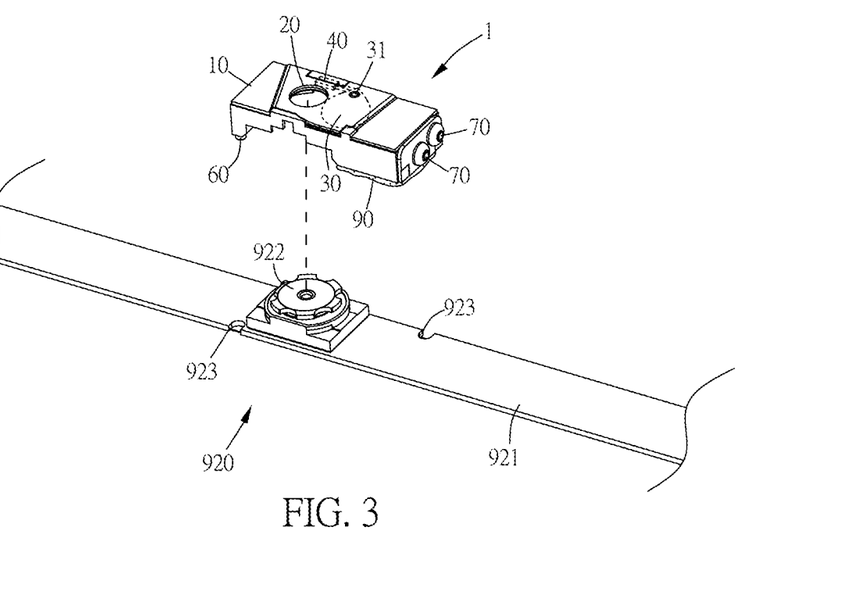
FIG. 3 illustrates a schematic drawing of the privacy protection module and the camera module separated in one embodiment of the present invention.
Figure 4:
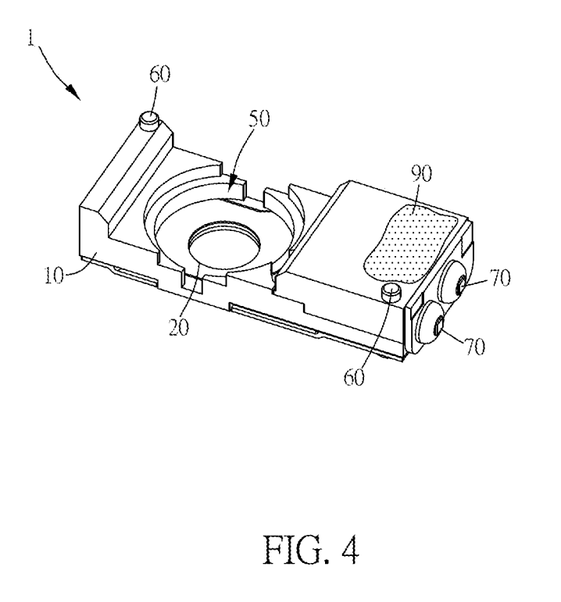
FIG. 4 illustrates a schematic drawing of the privacy protection module from another perspective in one embodiment of the present invention.
Figure 5:
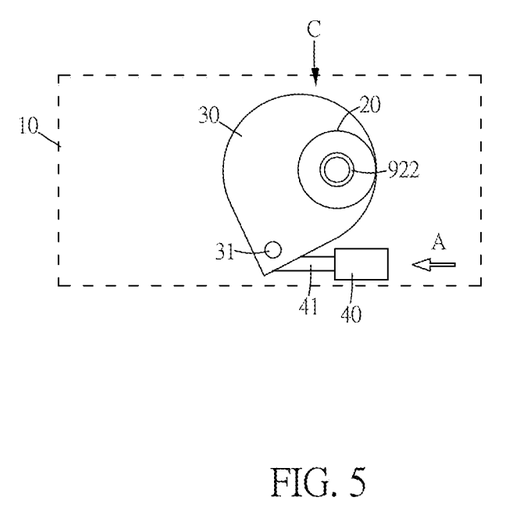
FIG. 5 illustrates a schematic drawing of the shutter which has been driven by the actuator to move to the first position in one embodiment of the present invention.
Figure 6:
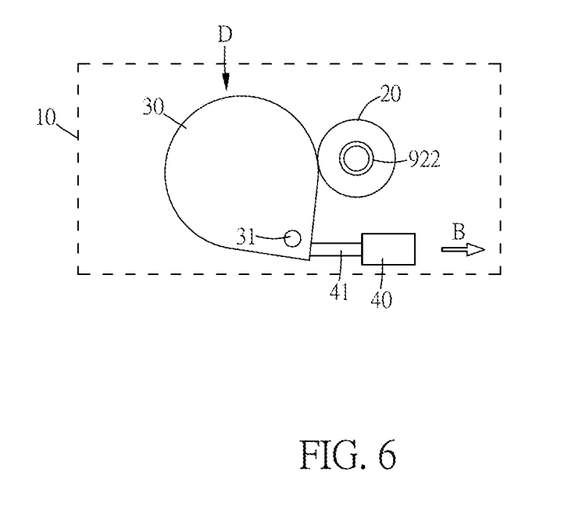
FIG. 6 illustrates a schematic drawing of the shutter which has been driven by the actuator to move to the second position in one embodiment of the present invention.
Figure 7:
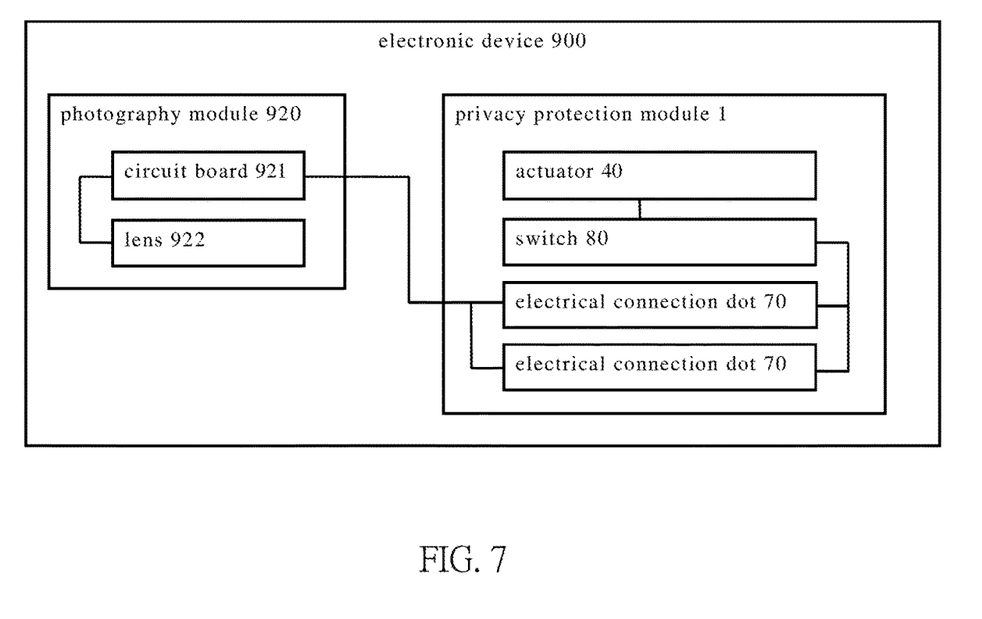
FIG. 7 illustrates a system structure drawing of the electronic device in one embodiment of the present invention.

Please refer to FIG. 1 to FIG. 7, which illustrate the electronic device and the privacy protection module thereof in one embodiment of the present invention. FIG. 1 illustrates a schematic drawing of the electronic device in one embodiment of the present invention. FIG. 2 illustrates a schematic drawing of the privacy protection module and the camera module in one embodiment of the present invention. FIG. 3 illustrates a schematic drawing of the privacy protection module and the camera module separated in one embodiment of the present invention. FIG. 4 illustrates a schematic drawing of the privacy protection module from another perspective in one embodiment of the present invention. FIG. 5 illustrates a schematic drawing of the shutter which has been driven by the actuator to move to the first position in one embodiment of the present invention. FIG. 6 illustrates a schematic drawing of the shutter which has been driven by the actuator to move to the second position in one embodiment of the present invention. FIG. 7 illustrates a system structure drawing of the electronic device in one embodiment of the present invention.

In one embodiment of the present invention, as shown in FIG. 1 to FIG. 3 and FIG. 7, the electronic device 900 and the privacy protection module 1 thereof prevent the device from being remote controlled by a hacker to capture images of people to protect the user's privacy. The electronic device 900 is a notebook computer, which includes an electronic device case 910, a camera module 920 and a privacy protection module 1. The camera module 920 is installed in the electronic device case 910. The camera module 920 includes a circuit board 921, a lens 922 and two positioning holes 923. The circuit board 921 provides electricity to the lens 922 and other electronic components which are electrically connected to the circuit board 921. The lens 922 is connected to the circuit board 921, and the lens 922 provides the photography function. However, the type of the electronic device 900 is not limited to the notebook; it can also be a smart phone.

In one embodiment of the present invention, as shown in FIG. 1 to FIG. 4, the privacy protection module 1 includes a case 10, a hole 20, a shutter 30, an actuator 40, a positioning groove 50, two positioning columns 60, two electrical connection dots 70, a switch 80 and an adhesive 90. The case 10 is a protective shell with a hollow layer. The case 10 covers the camera module 920, and the case 10 is located on the circuit board 921. The volume of the case 10 in this embodiment is very small; the length of the case 10 is between 8 and 10 mm, the width is between 3 and 5 mm, and the height is between 1.5 and 2.5 mm. However, the volume specification range is not limited to that design; it can be changed according to design requirements. The hole 20 is located on the case 10, and the hole 20 is aligned with the lens 922. The hole 20 is used for allowing the lens 922 which is not covered to capture an outside image.

In one embodiment of the present invention, as shown in FIG. 3, FIG. 5 and FIG. 6, the shutter 30 is located in the hollow layer of the case 10 and next to the hole 20 and is also linked to the actuator 40. The shutter 30 includes a pivotal connection part 31. The pivotal connection part 31 and the case 10 are pivotally connected to each other, whereby the shutter 30 can rotate relative to the case 10 with the pivotal connection part 31 as a shaft, and the shutter 30 can rotate to a first position C to cover the hole 20 and the lens 922 or rotate to a second position D to expose the hole 20 and the lens 922.

In one embodiment of the present invention, as shown in FIG. 3, FIG. 5 to FIG. 7, the actuator 40 is a two-way solenoid valve. The two-way solenoid valve is a valve with two electromagnetic coils, and the two coils allow the actuator 40 to move along different directions according to which coil receives electricity. The actuator 40 is located in the hollow layer of the case 10. The actuator 40 is electrically connected to the circuit board 921 for obtaining electricity. The actuator 40 includes a connection part 41, and the connection part 41 is connected to the shutter 30. When one of the coils of the actuator 40 receives electricity, the actuator 40 will be driven by the electricity to move along the first direction A, and the actuator 40 will move the shutter 30 to the first position C to cover the hole 20 and the lens 922. When the other one of the coils of the actuator 40 receives electricity, the actuator 40 will be driven by the electricity to move along the second direction B, and the actuator 40 will cause the shutter 30 to move to the second position D to expose the hole 20 and the lens 922 such that the lens 922 and the hole 20 are exposed to the outside; when the actuator 40 is driven by electricity, the actuator 40 will cause the shutter 30 to rotate relative to the case 10 between the first position C and the second position D. Because the two-way solenoid valve of the actuator 40 needs electricity only when starting to move along the first direction A or the second direction B, the two-way solenoid valve needs no electricity during other periods; thus, the function of saving electricity can be achieved.

In one embodiment of the present invention, as shown in FIG. 3 and FIG. 4, the positioning groove 50 is located on one side of the case 10, and that side is towards the lens 922. The shape of the positioning groove 50 is corresponded to the lens 922. The positioning groove 50 links to the hole 20, and the hole 20 is located at the center of the positioning groove 50. The positioning groove 50 is used for coordinating the shape of the lens 922 to cover the lens 922 to achieve the positioning function via the coordinating shape; furthermore, when the positioning groove 50 covers the lens 922, the lens 922 will align with the hole 20 at the center of the positioning groove 50 to be exposed to the outside; thus, image obscuration caused by assembly error can be avoided.

In one embodiment of the present invention, the two positioning columns 60 are connected to the case 10, the positions of the two positioning columns 60 are respectively corresponded to the two positioning holes 923, and the amount of the positioning columns 60 is corresponded to the amount of the positioning holes 923. The two positioning columns 60 are used for allowing the privacy protection module 1 to be precisely positioned on the circuit board 921. However, the amount of the positioning columns 60 and the positioning holes 923 are not limited to two; the amounts of the positioning columns 60 and the positioning holes 923 both can be changed to one according to design requirements. Furthermore, it is to be known that, because the positioning groove 50 and the positioning columns 60 both have the positioning function, the structures of the positioning groove 50 or the positioning columns 60 can be omitted from the privacy protection module 1 according to design requirements; for example, if the lens 922 is very small and it is hard to produce the positioning groove 50 with the corresponding shape inside of the case 10, the structure positioning groove 50 can be omitted from the privacy protection module 1 and the positioning columns 60 can be retained to achieve the positioning function.

In one embodiment of the present invention, as shown in FIG. 3 and FIG. 7, two electrical connection dots 70 are located on the case 10. The two electrical connection dots 70 are electrically connected to the switch 80 and the actuator 40, and the two electrical connection dots 70 are electrically connected to the circuit board 921 by welding. The two electrical connection dots 70 are used for obtaining electricity from the circuit board 921 to provide the electricity to the switch 80 and the actuator 40. The connection method of welding requires little space, which helps to reduce the whole volume of the privacy protection module 1 to meet the product demand of miniaturization.

In one embodiment of the present invention, as shown in FIG. 1 and FIG. 7, the switch 80 is located on the electronic device case 910. The switch 80 is provided for the user to operate it and thereby to allow the actuator 40 to obtain electricity, such that the actuator 40 can be turned on; it is to be known that the switch 80 is a button which can only be operated manually and that the switch 80 is not electrically connected to an external network; therefore, the switch 80 cannot be remotely controlled by a hacker to affect the function of the actuator 40. As shown in FIG. 3 and FIG. 4, the adhesive 90 is located on one side of the case 10, and the side of the case 10 is towards the circuit board 921; the case 10 is attached to the circuit board 921 via the adhesive 90.

In one embodiment of the present invention, as shown in FIG. 3 to FIG. 4, when installing the privacy protection module 1 and the camera module 920 into the electronic device 900, the assembly workers must smear adhesive 90 on the side of the case 10 which is towards the circuit board 921, align the two positioning columns 60 respectively with the two positioning holes 923, and align the positioning groove 50 with the lens 922. Then the assembly workers must plug the two positioning columns 60 into the two positioning holes 923 respectively, cause the positioning groove 50 to cover the lens 922, and cause the adhesive 90 to touch the circuit board 921, such that the case 10 and the camera module 920 can be combined with each other stably and the lens 922 can be exposed to the outside through the hole 20 in the center of the positioning groove 50. Then the assembly workers can weld the two electrical connection dots 70 such that the two electrical connection dots 70 are electrically connected to the circuit board 921 by welding. Finally, as shown in FIG. 1, the assembly workers can install the switch 80 on the electronic device case 910 and install the combining case 10 and the camera module 920 on the electronic device case 91; therefore, the privacy protection module 1 and the camera module 920 can be smoothly installed in the electronic device 900.

As shown in FIG. 1, FIG. 3, and FIG. 5 to FIG. 7, when the user does not need to use the camera module 920 to capture an image, the user can operate the switch 80 to start transferring electricity such that the electricity of the circuit board 921 can be transferred to one of the coils of the two-way solenoid valve of the actuator 40 via the electrical connection dot 70. After the one of the coils receives the electricity, the actuator 40 will move along the first direction A, and the actuator 40 will cause the shutter 30 to rotate to the first position C to cover the hole 20 and the lens 922. Therefore, the shutter 30 will cover the lens 922 to prevent the lens 922 from being maliciously controlled by a hacker to surreptitiously capture an image.

When the user needs to use the camera module 920 to capture an image, the user can operate the switch 80 to start transferring electricity such that the electricity of the circuit board 921 can be transferred to the other one of the coils of the two-way solenoid valve of the actuator 40 via the electrical connection dot 70. After the other one of the coils receives the electricity, the actuator 40 will move along the second direction B, and the actuator 40 will cause the shutter 30 to move to the second position D to expose the hole 20 and the lens 922 such that the lens 922 is exposed to the outside through the hole 20. Thus, the user can use the lens 922 of the camera module 920 to capture an external image.

Via the electronic device 900 and the privacy protection module 1 thereof of the present invention, the user can manually operate the switch 80 such that the shutter 30 covers the lens 922 or exposes the lens 922 to prevent a hacker from remotely controlling the electronic device 90 or surreptitiously acquiring images of others, and to ensure the user's privacy.

What is claimed is:

1. A privacy protection module, applied to an electronic device, wherein the electronic device comprises a camera module, the camera module comprises a circuit board and a lens, and the lens is connected to the circuit board, the privacy protection module comprising:
    a case, covering the camera module;
    a hole, located on the case, wherein the hole is aligned with the lens;
    an actuator, located in the case and electrically connected to the circuit board, wherein the actuator moves along a first direction or a second direction when the actuator is driven by electricity;
    a shutter, located next to the hole and linked to the actuator, wherein when the actuator moves along the first direction, the actuator causes the shutter to move to a first position for covering the lens; when the actuator moves along the second direction, the actuator causes the shutter to move to a second position such that the lens is exposed to an outside through the hole; and
    at least one electrical connection dot, wherein the at least one electrical connection dot is electrically connected to the circuit board by welding.

2. The privacy protection module as claimed in claim 1, further comprising a positioning groove, wherein the positioning groove is located on the case and a shape of the positioning groove is corresponded to the lens.

3. The privacy protection module as claimed in claim 2, wherein the shutter further comprises a pivotal connection part, the pivotal connection part and the case are pivotally connected to each other, the actuator comprises a connection part, and the connection part is connected to the shutter; when the actuator is driven by electricity, the actuator causes the shutter to rotate relative to the case between the first position and the second position.

4. The privacy protection module as claimed in claim 3, further comprising a switch, wherein the switch is electrically connected to the actuator.

5. The privacy protection module as claimed in claim 1, further comprising at least one positioning column, wherein the at least one positioning column is connected to the case; the circuit board further comprises at least one positioning hole; a position of the at least one positioning column is corresponded to the at least one positioning hole.

6. The privacy protection module as claimed in claim 5, wherein the shutter further comprises a pivotal connection part, the pivotal connection part and the case are pivotally connected to each other, the actuator comprises a connection part, and the connection part is connected to the shutter; when the actuator is driven by electricity, the actuator causes the shutter to rotate relative to the case between the first position and the second position.

7. The privacy protection module as claimed in claim 6, further comprising a switch, wherein the switch is electrically connected to the actuator.

8. An electronic device, comprising:
    a camera module, comprising a circuit board and a lens, wherein the lens is connected to the circuit board; and
    a privacy protection module, comprising:
        a case, covering the camera module;
        a hole, located on the case, wherein the hole is aligned with the lens;
        an actuator, located in the case and electrically connected to the circuit board, wherein the actuator moves along a first direction or a second direction when the actuator is driven by electricity;

a shutter, located next to the hole and linked to the actuator, wherein when the actuator moves along the first direction, the actuator causes the shutter to move to a first position for covering the lens; when the actuator moves along the second direction, the actuator causes the shutter to move to a second position such that the lens is exposed to an outside through the hole and at least one electrical connection dot, wherein the at least one electrical connection dot is electrically connected to the circuit board by welding.

9. The electronic device as claimed in claim 8, wherein the privacy protection module further comprises a positioning groove, the positioning groove is located on the case, and a shape of the positioning groove is corresponded to the lens.

10. The electronic device as claimed in claim 9, wherein the shutter further comprises a pivotal connection part, and the pivotal connection part and the case are pivotally connected to each other.

11. The electronic device as claimed in claim 10, wherein the privacy protection module further comprises a switch, and the switch is electrically connected to the actuator.

12. The electronic device as claimed in claim 11, further comprising an electronic device case, wherein the switch is located on the electronic device case.

13. The electronic device as claimed in claim 8, wherein the privacy protection module further comprises at least one positioning column, and the at least one positioning column is connected to the case; the circuit board further comprises at least one positioning hole; a position of the at least one positioning column is corresponded to the at least one positioning hole.

14. The electronic device as claimed in claim 13, wherein the shutter further comprises a pivotal connection part, and the pivotal connection part and the case are pivotally connected to each other.

15. The electronic device as claimed in claim 14, wherein the privacy protection module further comprises a switch, and the switch is electrically connected to the actuator.

16. The electronic device as claimed in claim 8, wherein the privacy protection module further comprises an adhesive, and the case is attached to the circuit board by the adhesive.

* * * * *